3,257,214
PROCESS FOR PREPARING A CANNED FOOD PRODUCT BY THE ADDITION THERETO OF A WATER SOLUBLE ALGINATE
Francis X. McDermott, Westfield, N.J., assignor to Kelco Company, San Diego, Calif., a corporation of Delaware
No Drawing. Filed Mar. 18, 1965, Ser. No. 440,951
18 Claims. (Cl. 99—182)

This application is a continuation-in-part of my application Serial No. 208,574, filed July 9, 1962 for Food Products which is now abandoned.

This invention relates to canned food products, and more particularly to those thickened with starchy material, and to their improvement by the use of certain alginates.

As is well-known, a large and important sub-class of canned goods comprises various food stuffs thickened with starchy material, such as starch and flour. Representative of these are creamed soups, such as cream of chicken, cream of asparagus, and cream of mushroom soups, the so-called New England type clam chowder, corn chowder, chow mein, chop suey, creamed tuna, creamed chicken, meat and fish stews, cream sauce, meat and poultry gravies, au gratin sauce and cheese based sauces and toppings, bisques, a la king and fricasse type products, puddings and cream type desserts, dessert sauces and fillings, and the like.

I find it convenient to use the term "canned cream food product" to mean canned food products of the type already described in which the consistency has been increased by the inclusion of a starchy material. In some cases, the formulation of the canned cream food product will include a milk product, such as milk or cream, examples of which are cream style soups; but the term also includes food products in which no milk product is used, as is the case in cream style canned corn, chop suey, chow mein, meat stew in gravy, and the like.

In the commonly used method of manufacturing canned goods of the type described, a batch of the product is heated to above the gelatinization temperature of the starch or flour used, so that it may thicken to the extent desired and required in the product concerned, cooking is continued as needed, the product is filled into cans, the latter are sealed, and then retorted to a temperature in the range of 230° F. to 250° F., and the so-processed cans are finally allowed to cool and are labeled and shipped. The thickening agent universally employed is either a starch, such as corn starch, waxy sorghum starch, waxy maize starch, potato starch, wheat starch, rice starch, tapioca starch, and the like, or a starchy flour such as wheat flour, rice flour, and the like. Any and all of these, in all combinations, will hereinafter be referred to as "starchy material."

A difficulty encountered in the employment of starch materials in canned foods of the type described is the phenomenon of retrogradation, by which is meant the partial or even complete loss of gel-forming and water-holding ability in the cooked starch. This causes a canned food product of the type described to become relatively sometimes heavily gelled and rough textured with non-uniform consistency. The retrogradation taking place during high temperature processing and/or during subsequent storage. It is naturally a defect of varying intensity depending upon the type and formulation of the foodstuff in question, the shelf history, and like factors. If an attempt is made to offset possible retrogradation in a food product of this type by increasing the percentage of starchy material, this leads to increased cooking time, difficulties in filling a pasty rather than a creamy material into the can, and the overemphasis of the flavor of the starchy material. Contrary to popular notion, starches and flours do not always add a pleasant flavor note to foodstuffs, and their inclusion is generally for mechanical reasons, that is, for their thickening effect, all this in spite of their masking effect upon flavor.

An object of the present invention is to provide a creamed food canning process and product in which the effects of retrogradation of starchy material therein are greatly reduced.

Another object of the invention is to provide a food product of the type described in which the consistency is relatively low during the cooking, filling and retorting or high temperature processing operations, but relatively and permanently high after cooling, during subsequent storage and on heating to serving temperatures.

Another object of the invention is to provide a food product of the type described having an enhanced flavor resulting from the inclusion of less starchy material.

Other objects of the invention will become apparent as the description thereof proceeds.

Generally speaking, and in accordance with an illustrative embodiment of my invention, I replace a portion, for example, 15% to 85%, of the starchy material in the usual formulation of a canned cream food product by a mixture of a sodium alginate with a calcium-binding salt or sequestering agent as hereinafter further described, the initial incorporation of the alginate-salt mixture into the cream food product being at a temperature sufficiently high to prevent thickening of the alginate, and the canned product containing some free calcium ion, present as part of the milk substance used in the formulation, where such is the case, or added as a soluble calcium salt where milk products are absent from the formulation. The amount of alginate added will in general be but a small fraction, for example $\frac{1}{3}$ to $\frac{1}{40}$, of the starchy material eliminated. The temperature suitable for adding the alginate-salt mixture is 160° F. or any desired temperature higher than this. The starchy material may be added before, during, or after the addition of the alginate-salt mixture; the order of addition is not important. In general, however, the starchy material is usually added in slurry form when the batch just begins to boil, so that it will normally be added subsequent to the addition of the alginate-salt mixture.

The results of proceedings in accordance with the invention are remarkable, in that the alginate has a negligible thickening effect upon the consistency of the mixture at the cooking, filling and retorting or processing temperature, all of which are above 160° F. This enables ease of agitation of the mixture in the kettle during cooking, good heat transfer with a consequent shortening of time required to reach boiling, rapidity of the filling operation, especially when a gravity feed filler is used, and improved heat penetration during retorting or high temperature processing.

On the other hand, as soon as the temperature of the material in the filled cans drops appreciably below 160° F., the alginate commences to thicken, and this thickening takes place for all practical purposes instantaneously when the temperature of the food product is lowered, for example, to room temperature. Thus, separation of emulsified fatty substances, and the like are discouraged while total product stability is greatly extended, since the alginate system is not subject to retrogradation.

It will be apparent that the objects of the invention are achieved. It may be noted likewise that the masking effect of the starchy material on the flavors present in the food product is reduced, giving what is known in the art as a greatly increased flavor release. The thickening brought about by the alginate is of a type which is pleasant to the mouth, the texture being soft and neither stringy nor harsh.

The alginate used may be any water-soluble alginate, such as sodium, lithium, potassium, or even ammonium alginate, although as a practical matter, principally sodium alginate comes into consideration.

The calcium-binding salt may be any of the so-called condensed sodium phosphates such as sodium hexametaphosphate, sodium tetraphosphate, tetrasodium pyrophosphate and sodium tripolyphosphate; or orthophosphates such as disodium phosphate, or even sodium carbonate or sodium citrate. The preparation of mixtures of alginates and calcium-binding salts is taught in U.S. Patent Nos. 2,097,228 and 2,485,934, the disclosure of which is incorporated herein by this reference. In U.S. Patent No. 2,485,934, emphasis is on partially depolymerized alginates, which give low viscosity dispersions in water, while U.S. Patent No. 2,097,228 pertains to alginates in normal or non-degraded form. Either may be used, but usually higher levels of the partially depolymerized alginates would be required.

The proportion of sodium or other alkali metal alginate to the sodium or other alkali-metal calcium-binding salt is subject to some variation, but in general will vary within the range 8:2 and 9.2:0.8. As taught in U.S. Patent No. 2,485,934, it is convenient to make a dry mixture of the alginate and the salt, both in comminuted form, with a dispersing agent, which may be an edible sugar, dried skim milk powder, a starchy material in powder form, or the like, to promote the initial dispersion of the mixture when added to the food product during processing, or when added to water to produce an intermediate slurry for subsequent addition to the food product. A suitable procedure is simply to use a portion of the starchy material included in the formulation of the canned cream food product and use it as a dispersing agent, in the sense just described, for the dry mix of alginate and salt.

Where a milk product is included at all in the formulation of the food product in question, it will generally be present in sufficient concentration to provide the calcium ions needed for carrying out the invention. Whenever milk products are absent, or used in negligibly small concentration, then calcium ions are provided by the inclusion of a suitable calcium salt, such as calcium chloride, calcium lactate, calcium gluconate, calcium citrate, anhydrous dicalcium phosphate, tricalcium phosphate, dicalcium phosphate dihydrate, and the like. In the absence of any milk solids at all, any of the calcium salts just mentioned may be included in the general range of 10% to 40% of the weight of alginate in the alginate-salt mixture heretofore described.

In certain instances the use of a calcium binder salt may be eliminated when milk products are absent and the added calcium salt is a salt of low water solubility. This is particularly so where the calcium salt and the water soluble alginate are not permitted to be in contact with each other for an extended period of time prior to heating the canned product. More particularly in this regard, I have obtained good results in accordance with the objects of this invention and without the use of a binder salt by using anhydrous dicalcium phosphate, tricalcium phosphate and dicalcium phosphate dihydrate as the calcium salt.

Recapitulating the foregoing, in applying my invention to commercial canning operations of food products containing starch I replace a portion of the starch with an algin and the said algin in the presence of calcium ions forms a gel to give a desired final body to the product. However, during the heat process step of such a product containing starch and algin, the viscosity is substantially less than such a product containing starch as the sole additive. It is important to preclude the formation of any substantial quantity of calcium algin gel during the heating step. This, as aforementioned, can be accomplished by the use of a binder salt or by selecting a calcium salt such as dicalcium phosphate dihydrate of relatively low water solubility and minimizing the contact time between the said calcium salt and the algin prior to heat processing. By such procedure the viscosity of the food product is kept at a minimum during the cooking and sterilization step with resulting improved heat transfer and a reduced amount of retrogradation of the food product.

As mentioned, the canned creamed food products, as defined herein, and to which the invention is directed, contain a starchy material. The amount of starchy material in products of this kind is subject to some variation, but in general ranges from 0.5% to 10%, by dry weight, of the finished canned creamed food product.

Some illustrative examples of my invention follow:

EXAMPLE I

| | Pounds |
|---|---|
| Minced fresh clams | 4 |
| Diced fresh potatoes | 20 |
| Chopped fresh onions | 5 |
| Diced bacon | 2 |
| Unbleached white wheat flour | 5 |
| Corn starch | ½ |
| Butter | ½ |
| Milk | 48 |
| Sodium alginate | 1/20 |
| Disodium phosphate | 1/200 |
| Powdered dextrose | 1/10 |
| Corn starch | 1/10 |
| Water | 14.745 |
| Total | 100 |

The first eight ingredients are mixed in a steam heated kettle and the temperature increased. When it has reached 170° F. the remaining five ingredients are added to the batch, with agitation continued, and heating continued until the temperature reaches 200° F. The temperature is held at this point for thirty minutes, in order for the potatoes and onions to cook properly. The 9th, 10th, 11th and 12th ingredients in the above list are dry blended before addition to the water, which forms the slurry which is added at the point already noted. The batch is allowed to cool to 175° F. and then filled into cans which are sealed, and then retorted at 240° F. for twenty minutes, subsequently allowed to cool to room temperature and labeled.

EXAMPLE II

Fresh corn kernels cut from the cob are placed in a kettle. For each 80 pounds of fresh corn, 15 pounds of an aqueous dispersion containing ½ pound of corn starch, 1/10 pound of salt, 1/50 pound of calcium gluconate, and 14.398 pounds of water are added. The mixture is brought to 165° F., whereupon 5 pounds of an aqueous solution containing 1/10 pound sodium alginate and 1/80 pound of sodium hexametaphosphate and 4.888 pounds water are added. The mixture is brought to 210° F., held there for twenty minutes, allowed to cool to 180° F., and filled in cans, which are subsequently sealed and retorted at 235° F. for fifteen minutes. The cans are then allowed to cool to room temperature and labeled and packed.

EXAMPLE III

The following is an example of the use of my invention in processing canned chow mein in which in lieu of using a calcium binder salt I employed a calcium salt of low water solubility. Canned chow mein normally consists of chow mein vegetables mixed with a thickened gravy or sauce. Chow mein vegetables are normally composed of bean sprouts, chopped celery, chopped onions, sliced mushrooms, sliced bamboo shoots, sliced red peppers, and sliced water chestnuts. The gravy is composed of water and/or meat broth with suitable seasonings and normally, thickened with starch. Starch is used at approximately 5% to 6% by weight of the gravy. The starch level may be adjusted to meet the severity of processing, to ultimately obtain the desired consumer consistency. Canned chow mein contains proportionate amounts of vegetables and gravy so that a No. 303 x 406 can of 16 ounce avoir. net weight will yield 9½ to 10 ounces avoir.-drained weight.

In conventional canning such a chow mein product is prepared by the steps including preparation of the food, filling of the cans, exhausting the cans, sealing the cans, heating, processing and cooling.

Prior to the filling operation, the prior conventional chow mein product is made by blending the prepared gravy with the prepared chow mein vegetables. The gravy is prepared by normal methods, the starch is slurried in a portion of the cold water, added to the remaining water or broth in a heating vessel equipped with agitation, whereupon the remaining seasoning ingredients are added and the mixture heated to approximately 185° F. to 190° F. for sufficient time to thoroughly gelatinize or thicken the starch. The chow mein vegetables are blanched in hot water at a temperature of 180° F. to 200° F. for the normal purpose of cleaning, removing respiration gases, shrinking to permit adequate filling. Blanching also inhibits enzymatic reactions which may occur during the preparation and have an adverse effect on the appearance and nutritive value of the chow mein. Since the bean sprouts contain diastatic enzymes, the blanching operation is usually 180° F. to 200° F. for five minutes.

The prepared gravy and blanched vegetables are mixed hot and filled into cans. The temperature of the mixture is maintained at 140° F. to 180° F. to comply with the heat-exhaust method. The effects of this method are to release air or gas trapped in the product, to expand the product and to displace air in the head space by water vapor. Each of these factors contribute to the formation of a vacuum when the can is cooled to a temperature below that at which it was sealed. Mechanical exhaust is a procedure where the filled cans are sealed in a vacuum-closing machine, the can being subjected to a vacuum during the sealing operation. However, with the starch thickened chow mein, the consistency is of a viscosity, such as to usually preclude the product being exhausted in any but by the heat-exhaust or steam injection methods.

After sealing or closing, the aforementioned conventional canned chow mein is heat processed in conventional canning equipment. The said chow mein like most food products is processed by the long accepted "in-can" method permitting simultaneous sterilization of the product and the container, with most process equipment in present use operating as follows:

(1) Discontinuous non-agitating (still) retort.
(2) Discontinuous agitating (end-over-end) retort.
(3) Continuous agitating (spiral roll) retort or cooker.

The mechanism of heat penetration is by convection or conduction. Products with generally low viscosity or water containing, heat by convection. Products like chow mein, or generally high viscosity products, heat by conduction. Conduction heating as compared to convection heating, requires a longer process time. The agitating retorts or cookers produce agitation of a product within the can, the extent of which depends on the consistency of the product and the operating speed of the equipment. This type of heating, "induced convection," increases the rate of heat penetration throughout the canned product, insuring an even cook throughout the can. Most food products that heat by convection lend themselves to the agitating cooker where the benefits of high temperature—short time over high temperature—long time in still retorts are accomplished.

The conventional canned chow mein thickened with starch, is of a consistency or viscosity that calls for processing in a still retort. For commercial sterility a No. 303 x 406 can of chow mein is processed in still retorts, with pressurized steam for 60 minutes at 250° F. and then cooled with cooling water to an internal can temperature of 100° F.

The thermal processing of chow mein, as in other foods, has two fundamental purposes. The first is to produce a sterile product and the second is to cook the material to a point where a minimum of further preparation is necessary for consumption. In canned chow mein and in other foods, the product after process may be found to be overcooked, with quality losses. An institutional size No. 10 can of chow mein will require up to three hours at 18 p.s.i. (255° F.) for commercial sterilization. Since only a few minutes are required for the periphery of the can to reach this temperature, a portion of said food is overcooked with detrimental loss of quality. With this and many products loss of quality is severe enough to preclude their being packed in any but a small can.

In keeping with my invention the foregoing method of preparing chow mein and similar food products may be improved by replacing a portion of the starch normally used in such a product with a delayed action algin gel system which alternatively need not include a calcium binder. The said system will thicken and gel after processing to provide the desired consumer consistency, yet during the said processing step the consistency will be such that good heat transfer will be effected and there will be a minimum of retrogradation of the product during the heating step.

More particularly, in keeping with the foregoing, the methods and formulas hereinafter set forth may be used:

*Formula part A*

| | Percent |
|---|---|
| Sodium alginate | 0.85 |
| Sugar | 1.72 |
| Starch | 1.00 |
| Seasonings (Salt, monosodium glutanate, hydrolyzed vegetable protein, pepper, garlic, turmeric, paprika, fat or oil) | 5.90 |
| Water (soft) | 90.53 |
| Total | 100.00 |

*Formula part B*

Dicalcium phosphate dihydrate-water slurry:

| | |
|---|---|
| Dicalcium phosphate dihydrate | 8 lbs. 10 ozs. |
| Water (soft) | 166 lbs. |
| Total | 174 lbs. 10 ozs. |

5 ml. of dicalcium phosphate dihydrate-water slurry is used with each No. 303 x 406 can with 9½ to 10 ozs. drained weight of vegetables and filled with the above composition or gravy to 16 ozs. net weight. This gives approximately 0.14% dicalcium phosphate dihydrate by weight of the above composition or gravy.

The preparation of Part A may be accomplished by preparing a slurry of the starch with a measured amount of soft water. The sodium alginate and sugar may be conveniently dry blended together and thereafter added to cold, soft water with good agitation in the heating vessel to be employed and may be mixed for 10 to 15 minutes to cause the sodium alginate to dissolve.

The said vessel may then be heated to 110° F. and the dry seasonings added. Thereafter the temperature of the resulting mixture may be heated to 160° F. and the aforementioned starch slurry added. Following this step the resulting admixture containing the starch may be heated to 185° F. and the fat added. The mixture so prepared including the fat may then be heated to 190° F. and held at this temperature in a can filling device. The cans to be filled with this solution may first receive an aliquot of the dicalcium phosphate water slurry (Formula Part B above) in the amount of 5 ml. as aforementioned. Thereafter, the blanched vegetables may be placed in the cans. Following these steps the cans may be filled with the Formula Part A composition or gravy. The cans may then be closed and passed through an agitated (spiral roll) cooker-cooler for about 12 minutes at 260° F. A chow mein product in keeping with the foregoing will be found to have good consistency and noticeably improved in flavor over a chow mein prepared with starch alone as the thickening agent as hereinabove described.

In carrying out my canning process in keeping with my invention as aforementioned, it is important to maintain the temperature of the Formula A composition at 185° F. to 190° F. before filling to insure proper internal can temperatures for the processing step. In addition it is desirable to check on the viscosity and consistency of the said composition. This may be accomplished by use of a Brookfield viscometer. I have found that a composition having a viscosity of 5 to 50 cps. and preferably 10 to 20 cps. as measured by such an instrument at 60 r.p.m. with a No. 1 spindle is desirable to obtain commercial sterility of such a product through an agitating spiral roll (closed roll) cooker-cooler with a process of time of 12 minutes at 260° F. It will be appreciated by those skilled in the art that the exact processing viscosities in keeping with my invention will vary somewhat depending on the processing equipment involved and the actual creamed canned food product being processed.

EXAMPLE IV

The following is a further example of using the method of my invention in which a binder salt, i.e., Calgon (trade name for sodium hexametaphosphate), was included in the formulation. The formula so employed is set forth below.

| | Gm. |
|---|---|
| Sodium alginate (algin) | 15.00 |
| Dicalcium phosphate dihydrate | 3.30 |
| Calgon | 0.75 |
| Sugar | 40.00 |
| Starch | 28.00 |
| Salt | 60.00 |
| Monosodium glutamate | 25.00 |
| Hydrolyzed vegetable protein | 18.00 |
| Garlic, powdered | 1.50 |
| Pepper | 2.25 |
| Water | 2500.00 |
| | 2693.80 |

The method that was employed in using the above formula was to prepare a slurry of starch with an aliquot of water (200 ml.). The algin, dicalcium phosphate, Calgon and sugar, were dry blended. The blend so produced was added to water heated to 140° F. to 150° F. with agitation to dissolve the said blend. The aforementioned starch slurry was then added to the heated solution containing the said algin and other ingredients. The mixture was then heated to 180° F. and the remaining dry ingredients were added. This solution containing all of the aforementioned ingredients was then heated to 190° F. and filled in No. 303 x 406 cans that had been filled with 9 to 10 oz. avoir. of blanched chow mein vegetables. The resulting can had a weight of 16 oz. avoir. The cans were then sealed and processed in an agitating end over end retort process for 15 minutes at a temperature of 255° F. The resulting product had a desirable consistency and an improved flavor over chow mein using starch only as the thickening ingredient.

As has been mentioned, the amount of starchy material present in formulations in accordance with my invention is generally within the range of 0.5% to 10%. Over the same range the amount of alginate, expressed as sodium alginate, used therein will vary from 15% to 85% of said starchy material which as a practical matter will comprise a working range of 1/40% to 1% of the total weight of the canned cream food product.

While I have described my invention with the aid of various specific examples, including the recitation of particular temperatures, proportions, ingredients, and the like, it will be clear that my invention is a broad one, and accordingly that numerous variations in detail are possible therewithin, all within the scope of the claims which follow.

What I claim is:

1. In the process of preparing a canned creamed food product of the type including a given amount of starch ingredients, the improvement comprising the steps of raising the temperature of such a food product containing calcium to a temperature of at least 160° F. in which the said amount of starch in said food product has been reduced to avoid retrogradation and a portion of the said reduced amount of starch in said food product replaced by adding thereto a mixture of a water soluble alginate and a calcium binding salt, said water soluble alginate being present within the range of 1/40% to 1% of the total weight of said canned creamed food product, and said calcium binding salt being present within the range from about 10% to about 25% by weight of said water soluble alginate, and thereafter cooling said product to a temperature below 160° F.

2. In the process of preparing a canned creamed food product including amylaceous ingredients, the improvement comprising bringing such a food product and in which calcium is present to a temperature of at least 160° F. and incorporating therewith sodium alginate and a calcium binding salt, said sodium alginate being present within the range of 1/40% to 1% by total weight of said product and said calcium binding salt being present within the range of from about 10% to about 25% by weight of said alginate, and said product containing starchy material within the range of 0.5% to 10% by total weight of said product; and subsequently cooling said product to a temperature below 160° F.

3. The process in accordance with claim 1 wherein said product contains calcium ion prior to the reaction thereof with said calcium binding salt, in an amount at least equivalent to 1/4 by volume of fresh milk.

4. The process in accordance with claim 1 wherein said alkinate is sodium alginate.

5. The process in accordance with claim 1 wherein said alginate is sodium alginate and said calcium binding salt is chosen from the group consisting of the sodium and sodium-hydrogen salts of orthophosphoric, tetraphosphoric, pyrophosphoric, hexametaphosphoric, tripolyphosphoric, citric, lactic, gluconic, and carbonic acids.

6. In the process of preparing a canned creamed food product of the type including starch in the formulation thereof to give body to the said food product at the time of use by the consumer thereof, the improvement comprising the steps of formulating such a product with a reduced quantity of starchy material within the range of 0.5% to 10% of the total weight of said product to reduce the consistency and body of the said product during a heat processing step at a temperature of at least 160° F. to avoid retrogradation and including in the composition of said food product during said high temperature processing an amount of water soluble alginate in the range of 1/40% to 1% by total weight of said product and a sufficient quantity of a calcium salt selected from the group consisting of dicalcium phosphate, tricalcium phosphate and dicalcium phosphate dihydrate to slowly react with said alginate and substantially increase the body of the resulting canned food product by the formation of a calcium alginate gel therein after the heat processing step at a temperature in excess of 160° F. and cooling of the said product to a temperature below 160° F.

7. In the process of preparing a canned creamed food product of the type including starchy material in the formulation thereof the improvement comprising the steps of reducing the normal amount of starch called for in said formulation to give a given desired body to said food product and incorporating therewith a water soluble alginate in the amount of 1/40% to 1% by weight of said product, placing the said food product in a can together with an amount of dicalcium phosphate sufficient to react with a substantial portion of said water soluble alginate to slowly form a calcium alginate gel, closing the said can and subjecting the closed can and contents to a cooking and serilization process at a temperature in excess of 160° F. and prior to any substantial reaction between the said alginate and calcium salt with resulting formation of calcium alginate gel in said can.

8. The process of claim 6 in which the water soluble alginate is sodium alginate and the calcium salt is dicalcium phosphate dihydrate.

9. The process of claim 7 in which the water soluble alginate is sodium alginate.

10. The process of claim 7 in which the water soluble alginate is an ammonium alginate.

11. In the process of preparing a canned creamed food product of the type including starchy material in the formulation thereof the improvement comprising adapting said food product for process in a continuous agitating spiral roll retort comprising the steps of reducing the amount of starch called for in said formulation to give a body to said food product in a viscosity range of 5 to 50 cps. as measured on a Brookfield Viscometer at 60 r.p.m. with a No. 1 spindle and incorporating therewith a water soluble alginate in the amount of 1/40% to 1% by weight of said product, placing the said food product in a can together with a source of calcium in an amount and in a form that will react with a substantial portion of said water soluble alginate to slowly form a calcium alginate gel, closing the said can and subjecting the closed can and contents to an agitation type cooking and sterilization process at a temperature in excess of 200° F. and prior to any substantial reaction bewteen the said alginate and calcium salt with resulting formation of calcium alginate gel in said can.

12. The process of claim 11 in which the said viscosity range is 10 to 20 cps.

13. The process of claim 11 in which the source of calcium is dicalcium phosphate.

14. The process of claim 11 in which the source of calcium is tricalcium phosphate.

15. The process of claim 11 in which the source of calcium is dicalcium phosphate dihydrate.

16. The process of claim 11 in which the water soluble alginate is sodium alginate and in which the source of calcium is dicalcium phosphate dihydrate.

17. The process of claim 11 in which a calcium binding salt is present in a range of from 10% to about 25% by weight of the water soluble alginate.

18. The process of claim 11 in which the source of calcium is milk.

References Cited by the Examiner

UNITED STATES PATENTS

| | | | |
|---|---|---|---|
| 2,097,228 | 10/1937 | Lucas | 99—78 |
| 2,485,934 | 10/1949 | Steiner | 99—136 |
| 2,563,996 | 8/1951 | Edgar | 99—139 |
| 2,653,876 | 9/1953 | Hanson et al. | 99—182 |
| 2,941,889 | 6/1960 | Welch | 99—186 |
| 2,949,366 | 8/1960 | Hunter et al. | 99—131 |

FOREIGN PATENTS 784,555  10/1957  Great Britain.

OTHER REFERENCES

"Kelco Algin," copyright Oct. 5, 1961, Kelco Co., Los Angeles, pp. 2, 5, 6 and 7.

A. LOUIS MONACELL, *Primary Examiner.*

J. M. GOLIAN, *Assistant Examiner.*